US008959570B2

(12) United States Patent
Wurth (10) Patent No.: US 8,959,570 B2
(45) Date of Patent: Feb. 17, 2015

(54) VERIFYING A SECURITY TOKEN (75) Inventor: Emmanuel Wurth, Saubens (FR)

(73) Assignee: International Business Machines Corporation, Armonk, NY (US)

( * ) Notice: Subject to any disclaimer, the term of this patent is extended or adjusted under 35 U.S.C. 154(b) by 843 days.

(21) Appl. No.: 13/166,707

(22) Filed: Jun. 22, 2011

(65) Prior Publication Data
US 2012/0005740 A1 Jan. 5, 2012

(30) Foreign Application Priority Data

Jul. 2, 2010 (EP) .................................... 10305726

(51) Int. Cl.
H04L 29/06 (2006.01)
H04L 9/00 (2006.01)

(52) U.S. Cl.
CPC .......... H04L 63/0869 (2013.01); H04L 63/102 (2013.01)
USPC .................................................. 726/1; 726/9

(58) Field of Classification Search
CPC .... H04L 63/20; H04L 63/0807; H04L 9/3213
See application file for complete search history.

(56) References Cited

U.S. PATENT DOCUMENTS

| 7,310,684 | B2 | 12/2007 | Patrick et al. | |
| 7,533,265 | B2 | 5/2009 | Ballinger et al. | |
| 7,665,120 | B2 | 2/2010 | Ramanathan et al. | |
| 2005/0223217 | A1* | 10/2005 | Howard et al. | 713/155 |
| 2006/0101409 | A1* | 5/2006 | Bemmel | 717/126 |
| 2006/0130131 | A1* | 6/2006 | Pai et al. | 726/9 |
| 2008/0148345 | A1* | 6/2008 | Rubio | 726/1 |
| 2008/0178271 | A1* | 7/2008 | Gajjala et al. | 726/6 |
| 2009/0037994 | A1* | 2/2009 | Buss | 726/9 |
| 2009/0205014 | A1* | 8/2009 | Doman et al. | 726/1 |

OTHER PUBLICATIONS

Author Unknown, WS-SecurityPolicy 1.2, OASIS Standard, Jul. 1, 2007, pp. 1-111, OASIS, Published on the World Wide Web at: http://docs.oasis-open.org/ws-sx/ws-securitypolicy/v1.2/ws-securitypolicy.html.
Author Unknown, WS-Trust 1.3, OASIS Standard, Mar. 19, 2007, pp. 1-75, OASIS, Published on the World Wide Web at: http://docs.oasis-open.org/ws-sx/ws-trust/200512/ws-trust-1.3-os.html.

(Continued)

Primary Examiner — Jung Kim
Assistant Examiner — Robert Leung
(74) Attorney, Agent, or Firm — Lee Law, PLLC; Christopher B. Lee (57) ABSTRACT A policy description for a web service is received at a web service client. The policy description includes a predefined security policy constraint, requires that an application requesting execution of the web service also provide a security token generated by a security token service, and requires that the security token complies with the predefined security policy constraint. A message is generated that is compliant with the policy description for obtaining the security token. The message is sent to the security token service. The security token generated by the security token service is received in response to receipt of the message. The security token is compared against the predefined security policy constraint to verify compliance of the security token generated by the security token service against the predefined security policy constraint.

21 Claims, 5 Drawing Sheets (56) References Cited

OTHER PUBLICATIONS

Jiandong Guo, Using WS-Trust Support in Metro to Secure Web Services, Web article/blog: Enterprise Tech Tips, Oct. 14, 2008, pp. 1-14, Oracle, Published on the World Wide Web at: http://blogs.sun.com/enterprisetechtips/entry/using_ws_trust_support_in.

Author Unknown, SAML for Web Services Interoperability with .NET, Presentation, Jun. 2008, pp. 1-51, SAP AG, Published on the World Wide Web at: http://www.sdn.sap.com/irj/scn/go/portal/prtroot/docs/library/uuid/307eab41-d0f9-2b10-9187-a425e938778d?QuickLink=index&overridelayout=true.

Zhengping Wu, et al., Using Web Services to Exchange Security Tokens for Federated Trust Management, Article: IEEE International Conference on Web Services, 2007, pp. 1-3, IEEE Computer Society, Published on the World Wide Web at: http://ieeexplore.ieee.org/stamp/stamp.jsp?tp=&arnumber=4279733.

Xiaolie Ye, et al., Verifying Security of Composed Interaction for Web Services, Journal: Journal of Software, Dec. 2009, pp. 1160-1168, vol. 4, No. 10, Academy Publisher, Published on the World Wide Web at: http://www.academypublisher.com/ojs/index.php/jsw/article/viewFile/041011601168/1451.

* cited by examiner

VERIFYING A SECURITY TOKEN

RELATED APPLICATIONS

This application claims priority to and claims the benefit of European Patent Application Serial No. EP10305726.1 titled "SYSTEM AND METHOD FOR VERIFYING A SECURITY TOKEN," which was filed in the European Patent Office on Jul. 2, 2010, and which is incorporated herein by reference in its entirety.

BACKGROUND

The present invention relates to a method and system for verifying a security token, generated by a security token service, against a security policy description.

The emerging service oriented architecture (SOA) standard is based now on many specifications. The great number of specifications and the fact that new standards are being adopted frequently increase the complexity of infrastructure required to run the services.

Furthermore, security of services has given rise to various standards that have emerged to organize the security of web services in a service oriented architecture. However, security services and functional services (for example to provide a business result) are often implemented and deployed independently and discrepancies may exist between them.

BRIEF SUMMARY

A method includes receiving, at a web service client, a policy description for a web service, the policy description including a predefined security policy constraint, the policy description requiring that an application requesting execution of the web service also provide a security token generated by a security token service, and requiring that the security token complies with the predefined security policy constraint; generating a message that is compliant with the policy description for obtaining the security token; sending the message to the security token service; receiving the security token generated by the security token service in response to receipt of the message; and comparing the security token against the predefined security policy constraint to verify compliance of the security token generated by the security token service against the predefined security policy constraint.

An apparatus includes a communication interface and a processor programmed to receive, at a web service client via the communication interface, a policy description for a web service, the policy description including a predefined security policy constraint, the policy description requiring that an application requesting execution of the web service also provide a security token generated by a security token service, and requiring that the security token complies with the predefined security policy constraint; generating a message that is compliant with the policy description for obtaining the security token; sending the message to the security token service via the communication interface; receiving the security token generated by the security token service in response to receipt of the message via the communication interface; and comparing the security token against the predefined security policy constraint to verify compliance of the security token generated by the security token service against the predefined security policy constraint.

A computer program product includes a computer readable storage medium including computer readable program code, where the computer readable program code when executed on a computer causes the computer to receive a policy description for a web service, the policy description including a predefined security policy constraint, the policy description requiring that an application requesting execution of the web service also provide a security token generated by a security token service, and requiring that the security token complies with the predefined security policy constraint; generate a message that is compliant with the policy description for obtaining the security token; send the message to the security token service; receive the security token generated by the security token service in response to receipt of the message; and compare the security token against the predefined security policy constraint to verify compliance of the security token generated by the security token service against the predefined security policy constraint.

BRIEF DESCRIPTION OF THE SEVERAL VIEWS OF THE DRAWINGS

Embodiments of the present subject matter will now be described by way of example with reference to the accompanying drawings in which like references denote similar elements, and in which:

FIG. 1 is a high level component block diagram of an example of an implementation of a system according to an embodiment of the present subject matter.

FIG. 2 is a block diagram of an example of an implementation of computer system according to an embodiment of the present subject matter.

FIG. 3 is a high level activity diagram of an example of an implementation of a process that may be used at a web service client according to an embodiment of the present subject matter.

FIG. 4 is an activity diagram of an example of an implementation of a process for generating software code for testing a security token service at a web service client according to an embodiment of the present subject matter.

FIG. 5 is an activity diagram of an example of an implementation of a process for testing a security token service using the generated test code at a web service client according to an embodiment of the present subject matter.

DETAILED DESCRIPTION

Figure 1:
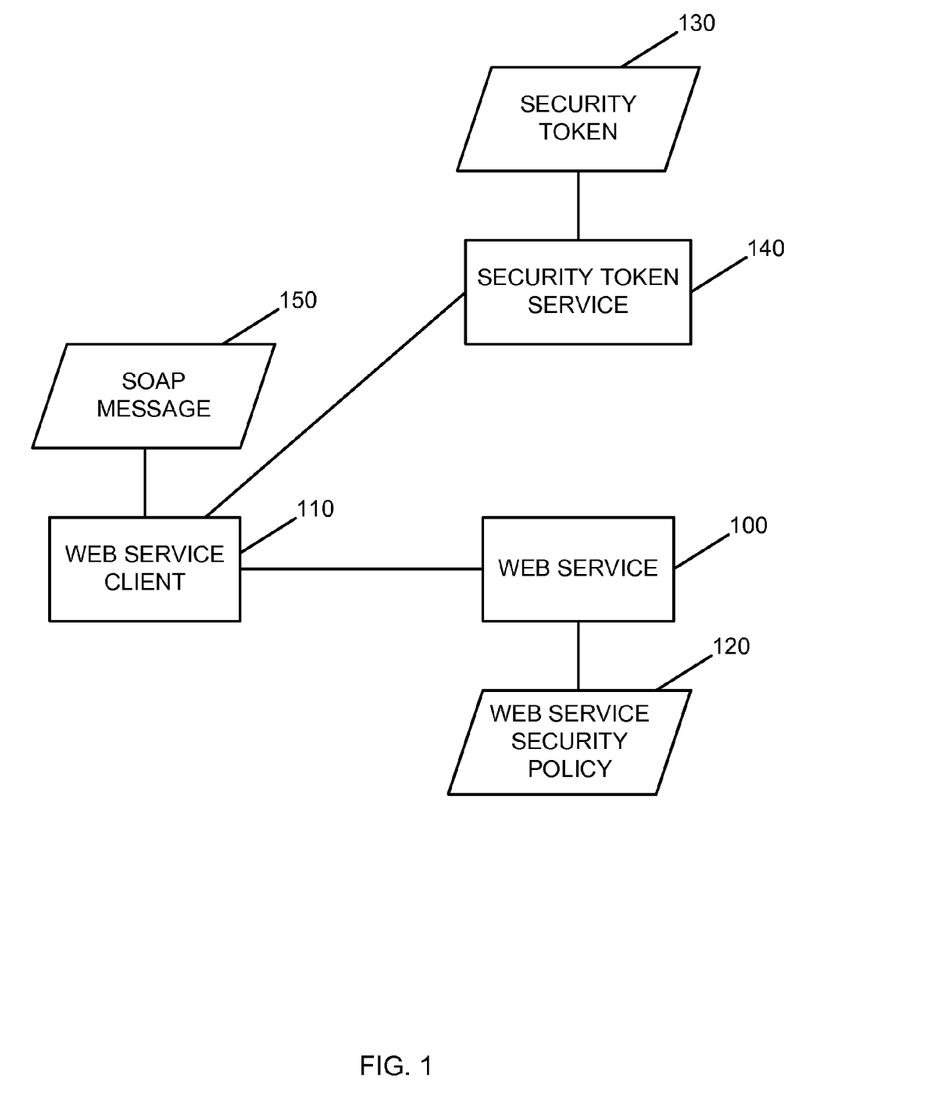

FIG. 1 is a high level component block diagram of an example of an implementation of a system where an embodiment of the present invention may be implemented. FIG. 1 illustrates a web service (100), a web service client (110), a web service security policy (120) describing the authentication and authorization requirements for accessing the web service (100), a security token (130) generated by a security token service (140), a simple object access protocol (SOAP) message (150) sent by the web service client (110).

When the web service client (110) connects to the web service (100), it receives the web service security policy (120) that identifies the security requirements for accessing the web service (100). The web service security policy (120) may be a structure file including elements associated with properties and values, such as an extensible markup language (XML) file. The web service security policy (120) defines security constraints and/or rules that must be respected by the web service client (110). The web service client (110) must then request a security token (130) from the security token service (140). The web service client (110) will then provide the security token (130) to the web service (100). The web service (100), relying on the security token (130), will trust that the web service client (110) has been adequately authenticated and authorized to access the web service (100).

To request the security token (130), the web service client (110) generates a SOAP message (150) and sends it to the security token service (140). The security token service (140) may be based for example on the web services (WS) Trust standard. The web service security policy (120) may be based on the WS Security policy standard.

The web service security policy (120) describes how the web service (100) is secured. This security includes an algorithm to be used to encrypt or sign the SOAP message sent to the web service (100), and also describes the requirements of security token service (140) to obtain a security token (130) to perform the encryption and signature, for example. An instance of these files, named the "policy" of the web service (100), may be used as templates to generate an instance of a client to test the security token service (140). This test represents a call to the security token service (140) based on the security token (130) for the security of the web service (100). Given the web service security policy (120), an implementation of the present subject matter may generate automatically the SOAP message (150), which will be sent to the security token service (140) to verify the creation and return mechanism for the security token (130). In an implementation of the present subject matter, the web service client (110) sends the SOAP token request to the security token service (140) and finally checks that the returned security token (130) corresponds to the security token requested and defined the web service security policy (120). Sending the correct SOAP information and analyzing the acknowledge sent by the security token service (140) represent a minimal test that may be performed on the security token service (140).

Figure 2:
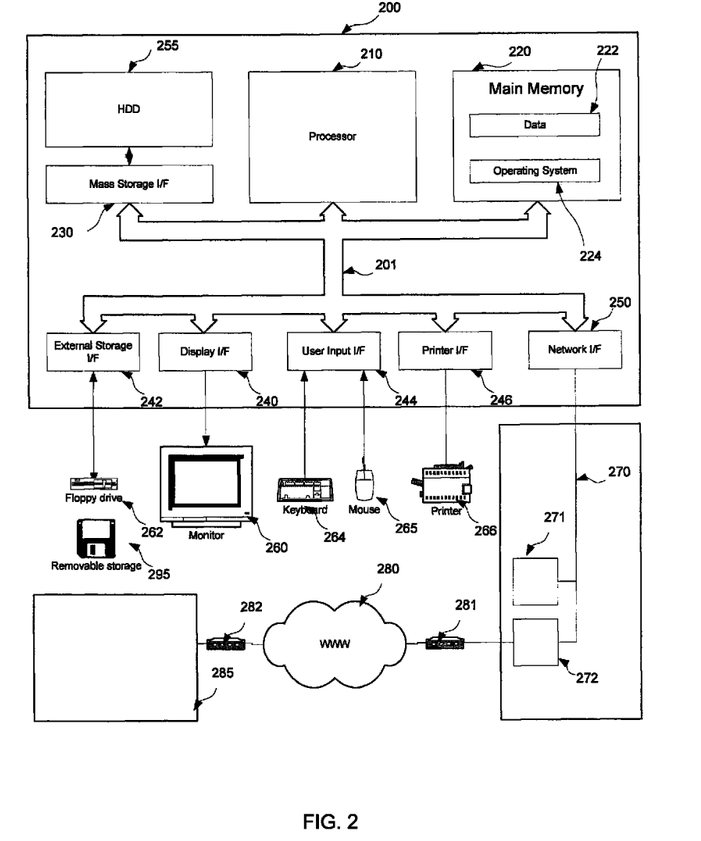

FIG. 2 is a block diagram of an example of an implementation of a computer system (200) including a processor 210, a main memory 220, a mass storage interface 230, a display interface 240, and a network communication interface 250. These system components are interconnected through the use of a system bus 201. Mass storage interface 230 is used to connect mass storage devices, such as a hard disk drive 255, to the computer system 200. One specific type of removable storage interface drive 262 is a floppy disk drive that may store data to and read data from a Floppy disk 295, but may other types of computer readable storage media may be used, such as a readable and optionally writable CD ROM drive. There is similarly provided a user input interface 244 that receives user interactions from interface devices such as a mouse 265 and a keyboard 264. There is still further provided a printer interface 246 that may send and optionally receive signals to and from a printer 266.

Main memory 220 in accordance with certain implementations includes data 222, and an operating system 224.

Computer system 200 may utilize virtual addressing mechanisms that allow the programs of computer system 200 to behave as if they only have access to a large, single storage entity instead of access to multiple, smaller storage entities such as main memory 220 and HDD 255. Therefore, while data 222 and operating system 224 are shown stored in the main memory 220, they may or may not be stored in main memory 220 at the same time. It should also be noted that the term "memory" is used herein to generically refer to the entire virtual memory of computer system 200.

Data 222 represents any data that serves as input to and/or output from any program in computer system 200. Operating system 224 may include a multitasking operating system, such as OS/400®. However, those skilled in the art will appreciate that the spirit and scope of the present invention is not limited to any one operating system.

Processor 210 may be constructed from one or more microprocessors and/or integrated circuits. Processor 210 executes program instructions stored in main memory 220. Main memory 220 stores programs and data that processor 210 may access. When computer system 200 starts up, processor 210 initially executes the program instructions that make up operating system 224. Operating system 224 is a sophisticated program that manages the resources of computer system 200. Some of these resources are processor 210, main memory 220, mass storage interface 230, display interface 240, network interface 250, and system bus 201.

Although computer system 200 is shown to contain only a single processor and a single system bus, multiple processors and/or multiple buses may be used. In addition, the interfaces used in the certain embodiments each include separate, fully programmed microprocessors that are used to off-load compute-intensive processing from processor 210. However, the present subject matter applies equally to computer systems that use I/O adapters to perform similar functions.

Display interface 240 is used to directly connect one or more displays 260 to computer system 200. These displays 260, which may be non-intelligent (e.g., dumb) terminals or fully programmable workstations, are used to allow system administrators and users to communicate with computer system 200. Note, however, that while display interface 240 is provided to support communication with one or more displays 260, computer system 200 does not necessarily require a display 265, because all needed interaction with users and other processes may occur via network interface 250.

Network interface 250 is used to connect other computer systems and/or workstations (e.g., 271 in FIG. 2) to computer system 200 across a network 270. The present subject matter applies equally no matter how computer system 200 may be connected to other computer systems and/or workstations, regardless of whether the network connection 270 is made using present-day analogue and/or digital techniques or via some networking mechanism of the future. In addition, many different network protocols may be used to implement a network. These protocols may include specialized computer programs that allow computers to communicate across network 270. Transmission control protocol/Internet protocol (TCP/IP) is an example of a suitable network protocol, for example over an Ethernet network. As shown, the network 270 connects the computer system 200 to two further devices 271 and 272, which may be other computer systems similar to that described above, or other network capable devices such as printers, routers etc. In the present example, network device 272 is a local server, which is connected via a modem 281 to a public network 280 such as the word wide web. By means of this public network 280 a connection to a remote device or system 285 may be established.

At this point, it should be noted that, while the present subject matter has been and will continue to be described in the context of a fully functional computer system, the present subject matter is capable of being distributed as a program product in a variety of forms, and that the present subject matter applies equally regardless of the particular type of interconnection used to actually carry out the distribution. Examples of suitable interconnection include: recordable type media such as floppy disks and CD ROM (e.g., 295 of FIG. 2), and transmission type media such as digital and analogue communications links.

Figure 3:
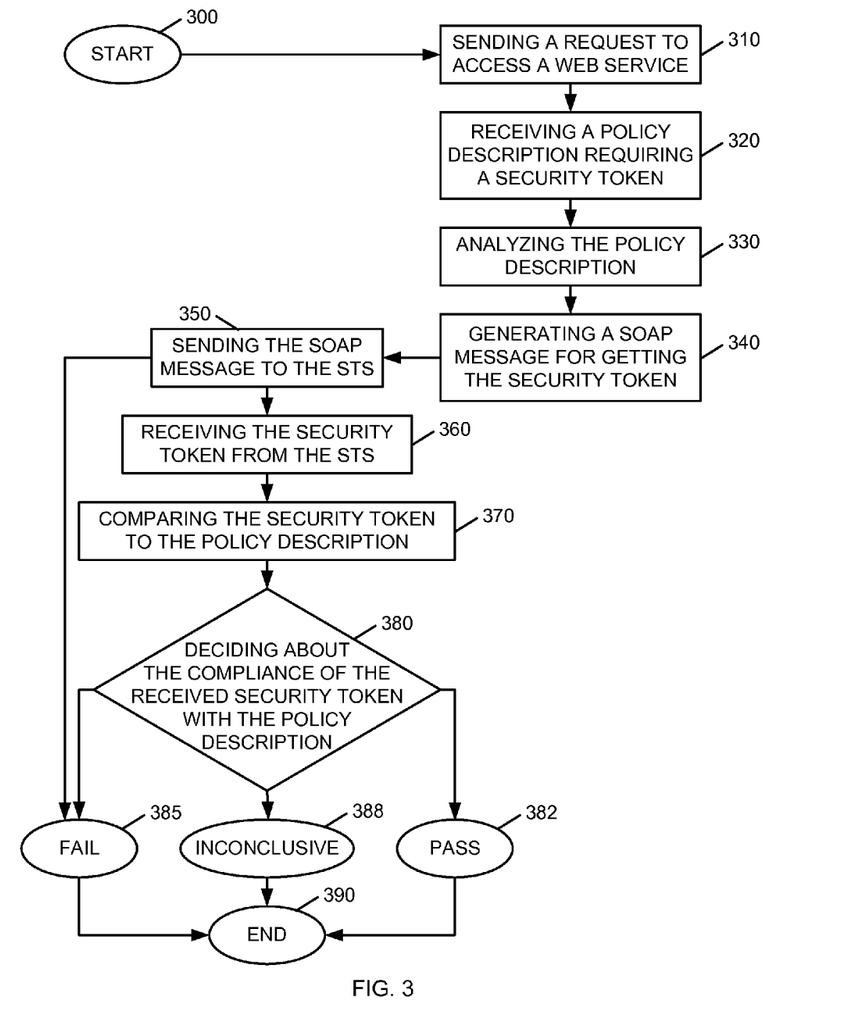

FIG. 3 is a high level activity diagram of an example of an implementation of a process that may be used at a web service client, such as the web service client (110), to implement the present subject matter. The process includes a start state (300), the step of sending a request to access a web service (310), the step of receiving a policy description requiring a security token (320), the step of analyzing the policy description (330), the step of generating a SOAP message for getting the security token (340), the step of sending the SOAP message to the security token service (140) (STS) (at step 350), the step of receiving the security token from the security token service (140) (STS) (at step 360), the step of comparing the security token to the policy description (370), the step of deciding about the compliance of the received security token with the policy description (380), a pass state (382), a fail state (385), an inconclusive state (388), and an end state (390).

The web service client (110) sends a request to access a web service (310). It receives in response a policy description (120) requiring a security token (320). The web service client (110) analyzes the policy description (330).

An example of a policy description syntax may be found below:

```
<sp:SupportingTokens xmlns.sp="http://schemas.xmlsoap.org/ws/2005/07/securitypolicy">
<wsp:Policy>
<sp:IssuedToken
sp:IncludeToken="http://schemas.xmlsoap.org/ws/2005/07/securitypolicy/IncludeToken/Always
ToRecipient">
    <Issuer xmlns="http://schemas.xmlsoap.org/ws/2005/07/securitypolicy">
    <Address
xmlns="http://www.w3.org/2005/08/addressing">http://localhost:8090/axis2/services/STS</Address>
   <Metadata xmlns="http://www.w3.org/2005/08/addressing">
   <mex:Metadata xmlns:mex="http://schemas.xmlsoap.org/ws/2004/09/mex"
xmlns.xsi="http://www.w3.org/2001/XMLSchema-instance">
   <mex:MetadataSection Dialect="http://schemas.xmlsoap.org/ws/2004/09/mex">
   <mex:MetadataReference>
   <Address
xmlns="http://www.w3.org/2005/08/addressing">http://localhost:8080/axis2/services/mex</Address>
   </mex:MetadataReference>
   </mex:MetadataSection>
   </mex:Metadata>
   </Metadata>
    </Issuer>
<sp:RequestSecurityTokenTemplate>
<t:TokenType
xmlns.t="http://schemas.xmlsoap.org/ws/2005/02/trust">urn:oasis:names:tc:SAML:1.0:assertion
</t:TokenType>
<t:KeyType
xmlns.t="http://schemas.xmlsoap.org/ws/2005/02/trust">http://schemas.xmlsoap.org/ws/2005/02
/trust/PublicKey</t:KeyType>
<t:KeySize xmlns:t="http://schemas.xmlsoap.org/ws/2005/02/trust">256</t:KeySize>
</sp:RequestSecurityTokenTemplate>
<wsp:Policy>
<sp:RequireInternalReference/>
</wsp:Policy>
</sp:IssuedToken>
<sp:SignedParts>
<sp:Header Name="To" Namespace="http://www.w3.org/2005/08/addressing"/>
</sp:SignedParts>
</wsp:Policy>
</sp:SupportingTokens>
```

The web service client (110) detects that a security token (130) must be provided to the web service (100) to be able to access the web service (100). The web service client (110) determines from the security policy (120) the address of the security token service (140) (STS) to be contacted for this web service (100) and the kind of security token (130) to be requested from the security token service (140). In the example above, the address may be found at the following element reproduced below from the example policy description syntax above:

```
<Issuer xmlns="http://schemas.xmlsoap.org/ws/2005/07/securitypolicy">
    <Address
xmlns="http://www.w3.org/2005/08/addressing">http://localhost:8090/axis2/services/STS</Address>
```

The web service client (110) generates a SOAP message (150) for getting the security token (340). The generated SOAP message (150) also comprises the required information so that the security token service (140) (STS) may authenticate and/or authorize the web service client (110) and the kind of security token requested. The following provides example syntax for request for a security token:

```
<sp:RequestSecurityTokenTemplate>
    <t:TokenType
xmlns.t="http://schemas.xmlsoap.org/ws/2005/02/trust">urn:oasis:names:tc:SAML:1.0:assertion
</t:TokenType>
    <t:KeyType
xmlns.t="http://schemas.xmlsoap.org/ws/2005/02/trust">http://schemas.xmlsoap.org/ws/2005/02
/trust/PublicKey</t:KeyType>
    <t:KeySize xmlns.t="http://schemas.xmlsoap.org/ws/2005/02/trust">256</t:KeySize>
</sp:RequestSecurityTokenTemplate>
    An example of syntax for a corresponding SOAP message (150) for requesting the
security token (130) may be:
    <?xml version='1.0' encoding='utf-8'?>
    <soapenv:Envelope xmlns:soapenv="http://www.w3.org/2003/05/soap-envelope">
        <soapenv:Body>
```

```
<wst:RequestSecurityToken xmlns:wst="http://schemas.xmlsoap.org/ws/2005/02/trust">
<wst:RequestType>http://schemas.xmlsoap.org/ws/2005/02/trust/Issue</wst:RequestType>
<wst:Lifetime><wsu:Created xmlns.wsu="http://docs.oasis-open.org/wss/2004/01/oasis-
200401-wss-wssecurity-utility-1.0.xsd">2009-12-
08T11:14:27.656Z</wsu:Created><wsu:Expires xmlns.wsu="http://docs.oasis-
open.org/wss/2004/01/oasis-200401-wss-wssecurity-utility-1.0.xsd">2009-12-
08T11:19:27.656Z</wsu:Expires></wst:Lifetime>
<wsp:AppliesTo
xmlns:wsp="http://schemas.xmlsoap.org/ws/2004/09/policy"></wsp:AppliesTo>
<t:TokenType xmlns.t="http://schemas.xmlsoap.org/ws/2005/02/trust">http://docs.oasis-
open.org/wss/oasis-wss-saml-token-profile-1.1#SAMLV1.1</t:TokenType>
<t:KeyType
xmlns.t="http://schemas.xmlsoap.org/ws/2005/02/trust">http://schemas.xmlsoap.org/ws/200
5/02/trust/PublicKey</t:KeyType>
<t:KeySize xmlns.t="http://schemas.xmlsoap.org/ws/2005/02/trust">256</t:KeySize>
<wst:Entropy><wst:BinarySecret
Type="http://schemas.xmlsoap.org/ws/2005/02/trust/Nonce">wES2Xe8q1By7agkQXKEetR
3hRyVIsvvi</wst:BinarySecret></wst:Entropy>
<wst:ComputedKeyAlgorithm>http://schemas.xmlsoap.org/ws/2005/02/trust/CK/PSHA1</w
st:ComputedKeyAlgorithm>
</wst:RequestSecurityToken>
</soapenv:Body>
</soapenv:Envelope>
```

The "Entropy" and "Lifetime" elements of the example SOAP message (150) have been added to increase the security of the SOAP message. The web service client (110) then sends the SOAP message (150) to the security token service (140) (STS) (at step 350). The web service client (110) receives in response the security token (130) from the security token service (140) (STS) (at step 360). Below is an example of syntax for a security token (130) that may be received:

```
<wst:RequestSecurityTokenResponse
xmlns.wst="http://schemas.xmlsoap.org/ws/2005/02/trust">
<wst:TokenType>http://docs.oasis-open.org/wss/oasis-wss-saml-token-profile-
1.1#SAMLV1.1</wst:TokenType>
<wst:RequestedAttachedReference><wsse:SecurityTokenReference
xmlns:wsse="http://docs.oasis-open.org/wss/2004/01/oasis-200401-wss-wssecurity-secext-
1.0.xsd">
<wsse:Reference URI="#_660c4119caf3c3883fcba6fba9ebc4af"
ValueType="http://docs.oasis-open.org/wss/oasis-wss-saml-token-profile-1.1#SAMLV1.1"
/></wsse:SecurityTokenReference>
</wst:RequestedAttachedReference><wst:RequestedUnattachedReference><wsse:Security
TokenReference xmlns:wsse="http://docs.oasis-open.org/wss/2004/01/oasis-200401-wss-
wssecurity-secext-1.0.xsd"><wsse:Reference URI="_660c4119caf3c3883fcba6fba9ebc4af"
ValueType="http://docs.oasis-open.org/wss/oasis-wss-saml-token-profile-1.1#SAMLV1.1"
/></wsse:SecurityTokenReference></wst:RequestedUnattachedReference><wsp:Applies To
xmlns:wsp="http://schemas.xmlsoap.org/ws/2004/09/policy"><wsa:EndpointReference
xmlns:wsa="http://schemas.xmlsoap.org/ws/2004/08/addressing"><wsa:Address>http://local
host:8080/services/sample06</wsa:Address></wsa:EndpointReference></wsp:AppliesTo><
wst:Lifetime><wsu:Created xmlns:wsu="http://docs.oasis-open.org/wss/2004/01/oasis-
200401-wss-wssecurity-utility-1.0.xsd">2009-12-
08T11:33:38.500Z</wsu:Created><wsu:Expires xmlns:wsu="http://docs.oasis-
open.org/wss/2004/01/oasis-200401-wss-wssecurity-utility-1.0.xsd">2009-12-
08T11:38:38.500Z</wsu:Expires></wst:Lifetime><wst:RequestedSecurityToken><Assertion
xmlns="urn:oasis:names:tc:SAML:1.0:assertion"
xmlns:xsd="http://www.w3.org/2001/XMLSchema"
xmlns:samlp="urn:oasis:names:tc:SAML:1.0:protocol"
xmlns:saml="urn:oasis:names:tc:SAML:1.0:assertion"
xmlns:xsi="http://www.w3.org/2001/XMLSchema-instance"
AssertionID="_660c4119caf3c3883fcbabfba9ebc4af" IssueInstant="2009-12-
08T11:33:38.500Z" Issuer="SAMPLE_STS" MajorVersion=" 1 "
MinorVersion=" 1 "><Conditions NotBefore="2009-12-08T11:33:38.500Z"
NotOnOrAfter="2009-12-08T11:38:38.500Z" /><AuthenticationStatement
AuthenticationInstant="2009-12-08T11:33:38.500Z"
AuthenticationMethod="urn:oasis:names:tc:SAML:1.0:am:password"><Subject><Name-
Identifier Format="urn:oasis:names:tc:SAML:1.1:nameid-format:emailAddress">CN=Sample
Client, OU=Rampart, O=Apache, L=Colombo, ST=Western,
C=LK</NameIdentifier><SubjectConfirmation><ConfirmationMethod>urn:oasis:names:tc:
SAML:1.0:cm:holder-of-key</ConfirmationMethod><KeyInfo
xmlns="http://www.w3.org/2000/09/xmldsig#"><X509Data
xmlns:xenc="http://www.w3.org/2001/04/xmlenc#"
xmlns:ds="http://www.w3.org/2000/09/xmldsig#"><X509Certificate>MIICTDCCAbUCBE
bJZMQwDQYJKoZIhvcNAQEEBQAwbDELMAkGA1UEBhMCTEsxEDAOBgNVBAgTB
1dlc3Rlcm4xEDAOBgNVBAcTB0NvbG9tYm8xDzANBgNVBAoTBkFwYWNoZTEQMA
4GA1UECxMHUmFtcGFydDEWMBQGA1UEAxMNU2FtcGxlIENsaWVudDAgFw0wNz
A4MjAwOTU0MTJaGA8yMDYyMDUyMzA5NTQxMlowbDELMAkGA1UEBhMCTEsx
```

```
EDAOBgNVBAgTB1dlc3Rlcm4xEDAOBgNVBAcTB0NvbG9tYm8xDzANBgNVBAoTB
kFwYWNoZTEQMA4GA1UECxMHUmFtcGFydDEWMBQGA1UEAxMNU2FtcGxlIENs
aWVudDCBnzANBgkqhkiG9w0BAQEFAAOBjQAwgYkCgYEAhjQp2NJRUrAEsPYIlg26
m34O16E6WkyBWMbkSvy/FJQoNg2HSOtqF/DHmej7qqJCDtiHtdZqCTOo28cpyB3XJ0g
6y23ADTy1v7qUjYieF4Bn3p9QFtyznUmKyZ6hK4CjGraYvcDgjRlnPkfeyVnNamkzJB7T
VRaLkumRlxHgxm0CAwEAATANBgkqhkiG9w0BAQQFAAOBgQBNLSbNEaGBj8GBo
XWBndY3JFvblPvI2mDbtZsNiggGOCezyAufGe6RnR3s5DjR5YQqPcMiDtlskFQm4/SRN
2Yh16E6l7LfsOhGQsPiPrDrci4T18pz1eDLSrtJiiBah1NdeISaD0kpoUiaNKiQiu16JCnxc8tG
Sw3nSPg44aLYmA==</X509Certificate></X509Data></KeyInfo></SubjectConfirmation>
</Subject></AuthenticationStatement><ds:Signature
xmlns:ds="http://www.w3.org/2000/09/xmldsig#">
<ds:SignedInfo>
<ds:CanonicalizationMethod Algorithm="http://www.w3.org/2001/10/xml-exc-c14n#" />
<ds:SignatureMethod Algorithm="http://www.w3.org/2000/09/xmldsig#rsa-sha1" />
<ds:Reference URI="#_660c4119caf3c3883fcba6fba9ebc4af">
<ds:Transforms>
<ds:Transform Algorithm="http://www.w3.org/2000/09/xmldsig#enveloped-signature" />
<ds:Transform Algorithm="http://www.w3.org/2001/10/xml-exc-
c14n#"><ec:InclusiveNamespaces xmlns:ec="http://www.w3.org/2001/10/xml-exc-c14n#"
PrefixList="code ds kind rw saml samlp typens #default xsd xsi" /></ds:Transform>
</ds:Transforms>
<ds:DigestMethod Algorithm="http://www.w3.org/2000/09/xmldsig#sha1" />
<ds:DigestValue>65iqzLNFuE0YIDkv1Go0 swLFIeA=</ds:DigestValue>
</ds:Reference>
</ds:SignedInfo>
<ds:SignatureValue>
bMh4d0LqpVZyA6NLBoma29HdkMlPCzhH3NILCWZ/ckZCiRhetZGpg+IzJIZVRyqzLvjh
pQ7DZbbXmDqJtcVzUfW4MfC2kiTRYForz+/P4+nNSnUMQIvm8KuZgz6rA/rCWqMvO1
IrqT8NN/wNtv8i7XyXsvDyEi69eJApPrqbwiM=
</ds:SignatureValue>
<ds:KeyInfo>
<ds:X509Data>
<ds:X509Certificate>
MIICkTCCAfqgAwIBAgIER7LDeTANBgkqhkiG9w0BAQQFADCBjDEhMB8GCSqGSIb
3DQEJARYSbmFuZGFuYUBhcGFjaGUub3JnMQswCQYDVQQGEwJMSzEQMA4GA1U
ECAwHV2VzdGVybjEQMA4GA1UEBwwHQ29sb21ibzEPMA0GA1UECgwGQXBhY2hl
MRAwDgYDVQQLDAdSYW1wYXJ0MRMwEQYDVQQDDApTYW1wbGUgU1RTMB4
XDTA4MDIxMzEwMTYyNVoXDTMzMDIwNjEwMTYyNVowgYwxITAfBgkqhkiG9w0
BCQEWEm5hbmRhbmFAYXBhY2hlLm9yZzELMAkGA1UEBhMCTEsxEDAOBgNVBA
gMB1dlc3Rlcm4xEDAOBgNVBAcMB0NvbG9tYm8xDzANBgNVBAoMBkFwYWNoZT
EQMA4GA1UECwwHUmFtcGFydDETMBEGA1UEAwwKU2FtcGxlIFNUUzCBnzANBg
kqhkiG9w0BAQEFAAOBjQAwgYkCgYEAj5hZmwzfwqY3H3Wmw6SspD71qwkvQ1cgcf
pD7zYUf3i3r0598xCR1rsc5zcQXH2URfH7SvROVAWZp9AUxyTi6SflfWftUR5SEDeYd
Wmq9knal8VsKRrcg7ciGOEBeMuwEv2HR2ltvwAyi3s/mvH3Q+8xBropWqHucgmtjNRK
nKcCAwEAATANBgkqhkiG9w0BAQQFAAOBgQBRUI7F0VqJqCxDsQykWtwcow0RM4
RZPiC6L5HNO3O5QOKrCYlnjwXcd6HvEBcv0sKV6/lLrXf9YckTL7G4WTnuVp3Rf/4ks
YgVuGg1LJxvI7FynRMW/plkk6vlMYyBL0/TP/40gs0DobtmYWWAwmXLAaMYjcQKyu
uiFOkm/lbvjQ==
</ds:X509Certificate>
</ds:X509Data>
</ds:KeyInfo></ds:Signature></Assertion>
</wst:RequestedSecurityToken></wst:RequestSecurityTokenResponse>
```

The web service client (110) then compares the security token to the policy description (370). The token type and the key name and size are elements that may be compared between the received security token (130) and the web service security description (120) that specifies that a security token (130) be provided. Any other elements may be verified in the same manner as the token type or the key name and size. In an implementation of the present subject matter, the web service client (110) may discover the elements defined in the security policy (120) that may also impact the structure and content of the security token (130). The web service client (110) may keep these elements in memory so that the web service client (110) may later reuse them to check/verify that the security token includes the required elements. Thus, for every element of a security token (13) mentioned in the security policy (120) within the RequestSecurityTokenTemplate element, such as the corresponding element of the example policy description syntax above, the web service client (110) looks for the same element in the response envelope to verify that the returned value is equal to the value(s) of the element in the RequestSecurityTokenTemplate element of the security policy (120), as represented by the example of the policy description syntax above.

Also, for each XML qualified element (e.g., QNAME) with a target namespace indicated within the RequestSecurityTokenTemplate element, a check may be performed to verify that such an element exists within the response (e.g., the lack of an element will not make the test fail, but inconclusive, most of the elements may be optional according to the trust specification), and to verify that the element includes the expected information.

For example, if the QNAME URI:X as represented by the following example syntax:
<t:TokenType     xmlns:t="http://schemas.xmlsoap.org/ws/2005/02/trust">
exists within the template, the same element, such as the following example syntax:
http://schemas.xmlsoap.org/ws/2005/02/trust:TokenType
will be searched for within the response of the security token service (140) (STS), and the value will be compared. The web service client (110) finally decides about the compliance of the received security token (130) with the policy description (380). The comparison is positive and the test is passed (382) if the security token (130) is compliant with all mandatory security constraints in the policy description, negative and the test is failed (385) if the security token (130) is not compliant with one of the mandatory security constraints in the policy description, and inconclusive (388) if the security token (130) is not compliant with an optional security constraint.

Below is a set of examples of security token types that may be tested, in an implementation of the present subject matter, described within a security assertion markup language (SAML) pseudo syntax.

---

SAML Token type
SAML may be used with a security token service (STS) system.
--> SAML V2 token

---

Template:

For such a token, the template may be, for example:

```
<sp:RequestSecurityTokenTemplate>
<t:TokenType
xmlns:t="http://schemas.xmlsoap.org/ws/2005/02/
trust">urn:oasis:names:tc:SAML:2.0:assertion
</t:TokenType>
<t:KeyType
xmlns:t="http://schemas.xmlsoap.org/ws/2005/02/
trust">http://schemas.xmlsoap.org/ws/2005/02/
trust/SymmetricKey</t:KeyType>
<t:KeySize xmlns:t="http://schemas.xmlsoap.org/ws/2005/02/
trust">256</t:KeySize>
</sp:RequestSecurityTokenTemplate>
```

Answer:

The answer for such a request may be, for example, in part:

```
<wst:RequestSecurityTokenResponseCollection xmlns:wst="http://docs.oasis-open.org/ws-sx/ws-trust/200512">
    <wst:RequestSecurityTokenResponse>
        <wst:TokenType> urn:oasis:names:tc:SAML:2.0:assertion</wst:TokenType>
        <wst:KeySize>256</wst:KeySize>
        <wst:RequestedAttachedReference>
            <wsse:SecurityTokenReference
                xmlns:wsse="http://docs.oasis-open.org/wss/2004/01/oasis-200401-wss-wssecurity-secext-1.0.xsd">
                <wsse:Reference URI="#urn:uuid:84DE938F17D3C897711256051606027"
                    ValueType="http://docs.oasis-open.org/wss/oasis-wss-saml-token-profile-1.1#SAMLV2.0"/>
            </wsse:SecurityTokenReference>
        </wst:RequestedAttachedReference>
        <wst:RequestedUnattachedReference>
            <wsse:SecurityTokenReference
                xmlns:wsse="http://docs.oasis-open.org/wss/2004/01/oasis-200401-wss-wssecurity-secext-1.0.xsd">
                <wsse:Reference URI="urn:uuid:84DE938F17D3C897711256051606027"
                    ValueType="http://docs.oasis-open.org/wss/oasis-wss-saml-token-profile-1.1#SAMLV2.0"/>
            </wsse:SecurityTokenReference>
        </wst:RequestedUnattachedReference>
        <wsp:AppliesTo xmlns:wsp="http://schemas.xmlsoap.org/ws/2004/09/policy">
            <wsa:EndpointReference
                xmlns:wsa="http://schemas.xmlsoap.org/ws/2004/08/addressing">
                <wsa:Address>http://localhost:8081/axis2/services/sample05</wsa:Address>
            </wsa:EndpointReference>
        </wsp:AppliesTo>
        <wst:Lifetime>
            <wsu:Created>2009-10-20T15:13:26.138Z</wsu:Created>
            <wsu:Expires>2009-10-20T15:13:56.138Z</wsu:Expires>
        </wst:Lifetime>
        <wst:RequestedSecurityToken>
            <saml:Assertion xmlns:saml="urn:oasis:names:tc:SAML:2.0:assertion"
                ID="urn:uuid:84DE938F17D3C897711256051606027" IssueInstant="2009-10-20T15:13:26.002Z"
                Version="2.0">
                <saml:Issuer>SAMPLE_STS</saml:Issuer>
                . . .
            </saml:Assertion>
        </wst:RequestedSecurityToken>
        <wst:RequestedProofToken>
            <wst:ComputedKey>http://docs.oasis-open.org/ws-sx/ws-trust/200512/CK/PSHA1</wst:ComputedKey>
        </wst:RequestedProofToken>
        <wst:Entropy>
            <wst:BinarySecret Type="http://docs.oasis-open.org/ws-sx/ws-trust/200512/Nonce">
                r/JgXgGMFb4afwRQpggqky8q4TQm7pdXm8RQq9IgCzI=
            </wst:BinarySecret>
        </wst:Entropy>
    </wst:RequestSecurityTokenResponse>
</wst:RequestSecurityTokenResponseCollection>
```

Test:
A test that may be performed with this example may include:
Test on the Token Type:
Check that the uniform resource identifier (URI) returned to indicate the token type within the RequestSecurityTokenResponse Element corresponds to the expected token type.
Test on the Key Size:
The key size is indicated within the answer/response and may be tested immediately.
--> SAML V 1.0
Template:

```
<sp:RequestSecurityTokenTemplate>
<t:TokenType>urn:oasis:names:tc:SAML:1.0:assertion</t:TokenType>
<t:KeyType>http://schemas.xmlsoap.org/ws/2005/02/trust/
SymmetricKey</t:KeyType>
<t:KeySize>128</t:KeySize>
</sp:RequestSecurityTokenTemplate>
```

Answer:
The answer is similar to the previous one with an update of the token type, size and key used.
Test:
A test that may be performed may be, for example:
Test on the Token Type:
Check that the URI returned to indicate the token type within the RequestSecurityTokenResponse Element corresponds to the expected token type.
Test on the Key Size:
The key size is indicated within the answer/response and may be tested immediately.
--> SAML V 1.1
Template:

```
<sp:RequestSecurityTokenTemplate>
<t:TokenType>http://docs.oasis-open.org/wss/oasis-wss-saml-token-
profile-1.1#SAMLV1.1</t:TokenType>
<t:KeyType>http://schemas.xmlsoap.org/ws/2005/02/trust/
PublicKey</t:KeyType>
<t:KeySize>1024</t:KeySize>
</sp:RequestSecurityTokenTemplate>
```

Answer:
The answer is similar to the previous one with an update of the token type, size and key used.
Test:
A test that may be performed may be, for example:
Test on the Token Type:
Check that the URI returned to indicate the token type within the RequestSecurityTokenResponse Element corresponds to the expected token type.
Test on the Key Size:
The key size is indicated into the answer and may be tested immediately.
--> Custom Token Type
Custom Key type
Template:

```
<sp:RequestSecurityTokenTemplate>
<t:TokenType> http://example.org/mysecuritytoken </t:TokenType>
</sp:RequestSecurityTokenTemplate>
```

Answer:

```
<s:Envelope xmlns:s='http://www.w3.org/2003/05/soap-envelope'
    xmlns:wss='http://docs.oasis-open.org/wss/2004/01/oasis-200401-wss-
wssecurity-secext-1.0.xsd'
    xmlns:wsu='http://docs.oasis-open.org/wss/2004/01/oasis-200401-wss-
wssecurity-utility-1.0.xsd'
    xmlns:wst='http://schemas.xmlsoap.org/ws/2004/04/trust'
    xmlns:wsa='http://schemas.xmlsoap.org/ws/2004/03/addressing' >
  <s:Header>
  <wsa:Action>
  http://schemas.xmlsoap.org/ws/2004/04/security/trust/RST/Issue
  </wsa:Action>
  <wsa:To>http://example.org/mywebservice</wsa:To>
  <wsa:ReplyTo>
    <wsa:Address>
    http://schemas.xmlsoap.org/ws/2004/03/addressing/role/anonymous
    </wsa:Address>
  </wsa:ReplyTo>
  <wsa:MessageID>
  uuid:3e9c26fb-f297-490f-a8c8-c6cef961bfc6
  </wsa:MessageID>
  <wss:Security>
    <wss:BinarySecurityToken wsu:Id='Me'
      ValueType='http://docs.oasis-open.org/wss/2004/01/oasis-200401-wss-
x509-token-profile-1.0#X509v3'
      EncodingType='http://docs.oasis-open.org/wss/2004/01/oasis-200401-
wss-soap-message-security-1.0#Base64Binary' >
      dX5CZ8lqZl1X2v1s/uqwDddPOqnauJGTmKoEjQGn . . .
    </wss:BinarySecurityToken>
    <ds:Signature xmlns:ds='http://www.w3.org/2000/09/xmldsig#' >
      <!-- Signature over the request -->
    </ds:Signature>
  </wss:Security>
  </s:Header>
  <s:Body>
  <wst:RequestSecurityToken>
    <wst:TokenType>
    http://example.org/mysecuritytoken
    </wst:TokenType>
    <wst:RequestType>
    http://schemas.xmlsoap.org/ws/2004/04/security/trust/Issue
    </wst:RequestType>
    <wst:Base>
    <wss:SecurityTokenReference>
      <wss:Reference URI='#Me' ValueType='http://docs.oasis-
open.org/wss/2004/01/oasis-200401-wss-x509-token-
profile-1.0#X509v3' />
    </wss:SecurityTokenReference>
    </wst:Base>
  </wst:RequestSecurityToken>
  </s:Body>
</s:Envelope>
```

Test:
A test that may be performed with this example, may be for example:
Test on the Token Type:
Check that the URI returned to indicate the token type within the RequestSecurityTokenResponse Element corresponds to the expected token type.
--> MSN key type
Note: the URI depends on the version of multi-service network (MSN).
Template:

```
<sp:RequestSecurityTokenTemplate>
<t:TokenType> urn:passport:legacy </t:TokenType>
</sp:RequestSecurityTokenTemplate>
```

Answer:

```
<wst:RequestSecurityTokenResponse>
    <wst:TokenType>urn:passport:legacy</wst:TokenType>
    <wsp:AppliesTo xmlns:wsa="http://schemas.xmlsoap.org/ws/
2004/03/addressing">
        <wsa:EndpointReference>
            <wsa:Address>http://Passport.NET/tb</wsa:Address>
        </wsa:EndpointReference>
    </wsp:AppliesTo>
    <wst:LifeTime>
        <wsu:Created>2006-12-06T05:12:10Z</wsu:Created>
        <wsu:Expires>2006-12-07T05:12:10Z</wsu:Expires>
    </wst:LifeTime>
    <wst:RequestedSecurityToken>
        <EncryptedData
        xmlns="http://www.w3.org/2001/04/xmlenc#"
            Id="BinaryDAToken0"
        Type="http://www.w3.org/2001/04/xmlenc#Element">
            <EncryptionMethod Algorithm="http://www.w3.org/2001/
04/xmlenc#tripledes-cbc">
            </EncryptionMethod>
```

-continued

```
        <ds:KeyInfo xmlns:ds="http://www.w3.org/2000/09/
xmldsig#">
            <ds:KeyName>http://Passport.NET/STS</ds:KeyName>
        </ds:KeyInfo>
        <CipherData>
            <CipherValue>
                cipher data you don't need to worry about
            </CipherValue>
        </CipherData>
    </EncryptedData>
</wst:RequestedSecurityToken>
<wst:RequestedTokenReference>
    <wsse:KeyIdentifier
    ValueType="urn:passport"></wsse:KeyIdentifier>
    <wsse:Reference
    URI="#BinaryDAToken0"></wsse:Reference>
</wst:RequestedTokenReference>
<wst:RequestedProofToken>
    <wst:BinarySecret>ignore this one</wst:BinarySecret>
</wst:RequestedProofToken>
</wst:RequestSecurityTokenResponse>
```

Test:
A test that may be performed may include, for example:
Test on the Token Type:
Check that the URI returned to indicate the token type within the RequestSecurityTokenResponse Element corresponds to the expected token type.
Test on the Key Size:
The key size is indicated within the answer/response and may be tested immediately.
--> WS Secure conversation Token Type
Secure Conversation
Template

```
<sp:RequestSecurityTokenTemplate>
    <t:TokenType> http://schemas.xmlsoap.org/ws/2005/02/sc/
sct </t:TokenType>
    <t:KeySize xmlns:t="http://schemas.xmlsoap.org/ws/2005/02/
trust">256</t:KeySize>
</sp:RequestSecurityTokenTemplate>
```

Answer:

```
<wst:RequestSecurityTokenResponse Context="uuid:a4799798 . . . " ><wst:TokenType>
http://schemas.xmlsoap.org/ws/2005/02/sc/sct </wst:TokenType>
<wst:RequestedSecurityToken> <wsc:SecurityContextToken wsu:Id=" . . . ">
<wsu:Identifier>uuid: . . . </wsu:Identifier> </wsc:SecurityContextToken>
</wst:RequestedSecurityToken> <wst:RequestedAttachedReference>
<wsse:SecurityTokenReference> <wsse:Reference
ValueType="http://schemas.xmlsoap.org/ws/2005/02/sc/sct" URI="#uuid-901eb2cc-bbed-
48ff-
9deb-e6b14846e3ed-1"/> </wsse:SecurityTokenReference>
</wst:RequestedAttachedReference> <wst:RequestedUnattachedReference>
<wsse:SecurityTokenReference> <wsse:Reference URI="urn:uuid:41bd2d6a-b5ea-4025-
8d33-
7512fbf9f3f4"
ValueType=http://schemas.xmlsoap.org/ws/2005/02/sc/sct/> </wsse:SecurityTokenReference>
</wst:RequestedUnattachedReference> <wst:RequestedProofToken> <xenc:EncryptedKey>
<xenc:EncryptionMethod
Algorithm="http://schemas.xmlsoap.org/2005/02/trust/tlsnego#TLS_Wrap" />
<xenc:CipherData> <xenc:CipherValue>
FwMBACgGCoXa7cHbQ0a2drmWd4wmqCYGfiCSbNjt6slR2ZFWI8r9CH+i1gdE
</xenc:CipherValue> </xenc:CipherData> </xenc:EncryptedKey>
</wst:RequestedProofToken>
<wst:Lifetime> <wsu:Created> . . . </wsu:Created> <wsu:Expires> . . . </wsu:Expires>
</wst:Lifetime> <wst:KeySize>256</wst:KeySize> <wst:BinaryExchange
EncodingType=" . . . #Base64Binary" ValueType=" . . . /tlsnego"> FgMBDf0CAAB . . .
</wst:BinaryExchange> </wst:RequestSecurityTokenResponse>
<wst:RequestSecurityTokenResponse Context="uuid:a4799798 . . . " ><wst:Authenticator>
<wst:CombinedHash> . . . </wst:CombinedHash> </wst:Authenticator>
</wst:RequestSecurityTokenResponse>
```

Test:
A test that may be performed with this example may include:
Test on the Token Type:
Check that the URI returned to indicate the token type within the RequestSecurityTokenResponse Element corresponds to the expected token type.
Test on the Key Size:
The key size is indicated within the answer and may be tested immediately.
→ Secure Conversation 1.3
Template:

```
<sp:RequestSecurityTokenTemplate>
    <t:TokenType> http://docs.oasis-open.org/ws-sx/ws-
secureconversation/200512/sct
    </t:TokenType>
</sp:RequestSecurityTokenTemplate>
```

Answer:
Similar to the previous one with the namespaces adjusted.
Test:
A test that may be performed with this example may include:
Test on the Token Type:
Check that the URI returned to indicate the token type within the RequestSecurityTokenResponse Element corresponds to the expected token type.
Test on the Key Size:
The key size is indicated into the answer and may be tested immediately.
→ X509 Token Types
Template:

```
<sp:RequestSecurityTokenTemplate>
  <t:TokenType> http://docs.oasis-open.org/wss/2004/01/oasis-200401-
  wss-x509-token-profile-1.0#X509v3</t:TokenType>
</sp:RequestSecurityTokenTemplate>
```

Answer:

```
<RequestSecurityTokenResponse>
<TokenType>http://docs.oasis-open.org/wss/2004/01/
oasis-200401-wss-x509-token-profile-1.0#X509v3</TokenType>
<DispositionMessage xml:lang="en-US"
xmlns="http://schemas.microsoft.com/windows/pki/2009/01/enrollment">
Issued</DispositionMessage>
<BinarySecurityToken
ValueType="http://docs.oasis-open.org/wss/2004/01/
oasis-200401-wss-wssecurity-secext-1.0.xsd#PKCS7"
EncodingType="http://docs.oasis-open.org/wss/2004/01/
oasis-200401-wss-wssecurity-secext-1.0.xsd#base64binary"
xmlns="http://docs.oasis-open.org/wss/2004/01/oasis-200401-wss-
wssecurity-secext-1.0.xsd">MIIR1AYJKoZIhvcNAQcCoIIRhTCCEYEC
AQMxCzAJBgUrDgMCGgUAMH0GCCsGAQUFwwDoHEEbzBtMGcwI
QIBAQYIKwYBBQUHBwExEjAQAgEAMAMCAQEMBklzc3VlZDBCg
ECBgorBgEEAYI3CgoBMTEwLwIBADADAgEBMSUwIwYJKwYBBA
GCNxURMRYEFFis145+YbEa1zssa0G63KkQD6+
OMAAwAKCCD0Ew
ggNbMIICQ6ADAgECAhAeqF9153Dzn0o0G27H8w6RMA0GCSqGSIb3
DQEBBQUAMDQxGzAZBgNVBAsTEk1pY3Jvc29mdCBQS0kgVGVhb
TEVMBMGA1UEAwwMRkJfRW50Um9vdENBMB4XDTA5MDMwMz
AzMjQxMloXDTE0MDMwMzAzMzQxMFowNDEbMBkGA1UECxMS
TWljcm9zb2Z0IFBLSSBUZWFtMRUw . . .
```

Test:
A test that may be performed with this example may include:
Test on the Token Type:
Check that the URI returned to indicate the token type within the RequestSecurityTokenResponse Element corresponds to the expected token type.

Figure 4:
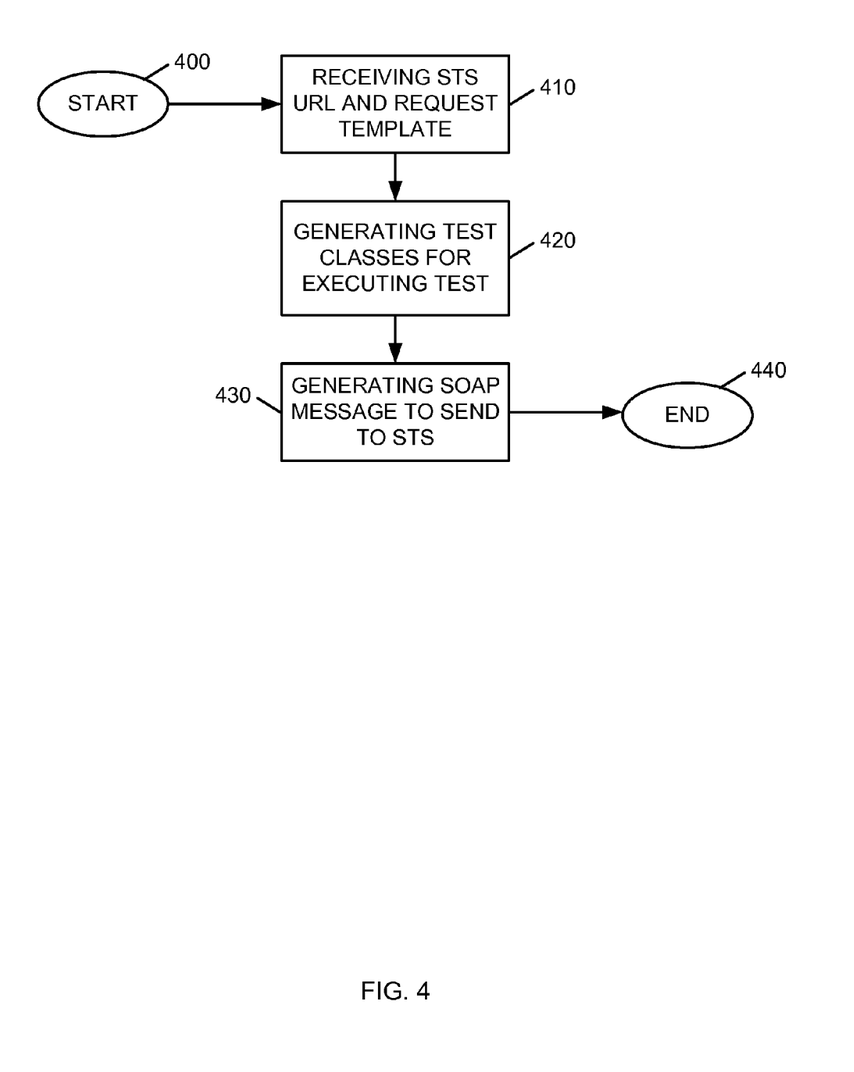

FIG. 4 is an activity diagram of an example of an implementation of a process for generating software code for testing a security token service at a web service client, such as the web service client (110), including a start state (400), a step of receiving the STS URL and the request template (410), a step of generating test classes for executing the test (420), a step of generating the SOAP message to send to the STS (430), and an end state (440).

The test client, which may be the web service client (110), may be generated dynamically from any web service security policy (120). The code for testing a security token service (140) identified in a security policy (120) may perform the steps described with respect to FIG. 3 and may be implemented in a system described with respect to FIG. 1 and/or FIG. 2.

The component for generating the test client may receive the STS URL and the request template (410) from the security policy (120). However this step is optional and this component may generate code that will receive such information only later, when it is executed.

This component then generates the test classes for executing the test (420). It may also optionally generate the SOAP message to send to the STS (430). Such SOAP message generation may also be performed by the test client itself, as described with respect to FIG. 1 through FIG. 3.

Figure 5:
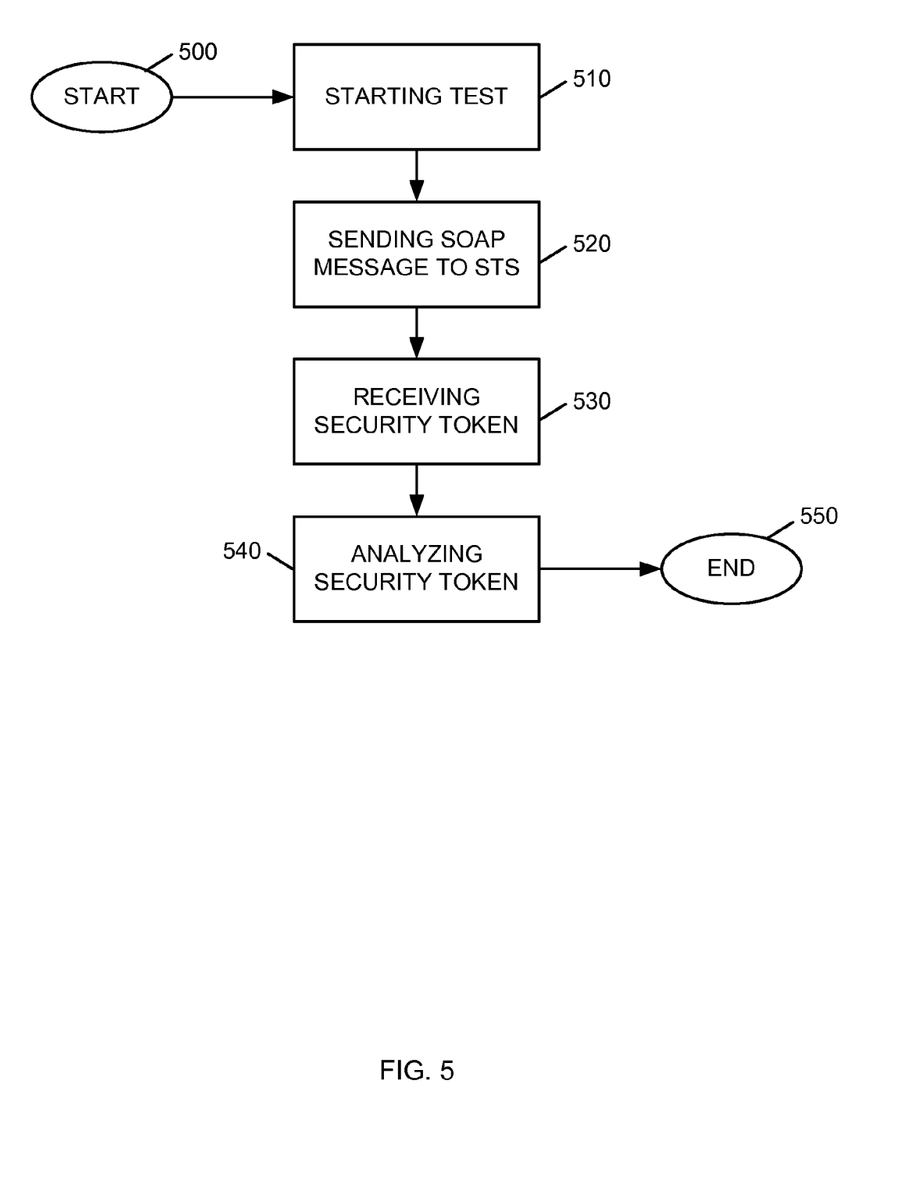

FIG. 5 is an activity diagram of an example of an implementation of a process for testing a security token service using the generated test code at a web service client, such as the web service client (110), including: a start state (500), a step of starting the test (510), a step of sending the SOAP message to the STS (520), a step of receiving the security token (530), a step of analyzing the security token (540), and an end state (550).

The test client is started (510). It then sends the SOAP message to the STS (520). It receives the security token (530) in response. The test client then analyzes the security token (540).

The outcome/result of the analysis phase (Pass, Fail, Inconclusive) may be used to take further actions. For example, if the test is passed, the web service client (110) may send a request to the web service (100) as it knows that the security token is valid, and it may expect that the request will be processed by the web service (100). However if the test, which may be performed by the web service client (110), has failed, then the web service client (110) may avoid sending the request to the web service (100) as it will certainly be rejected. If the test is inconclusive, then the web service client (110) may proceed with sending the request. It may however further raise a warning to the web service (100) or the security token service (140) administrator and identify the issue therein.

The test of the security token (130) may thus be performed directly by the web service client (110) without further exchange of messages. Moreover this test may save two message exchanges if the test failed (one message with an incorrect security token (130) sent by the web service client (110) to the web service, and one message—probably an error message—in a response from the web service (100) to the web service client (110)). This may save bandwidth resources and further increase the performance of software applications by reducing time that is wasted waiting for messages to be transferred over the network and the response instead of performing useful computing.

Another implementation includes a system and method for generating a generic test client for testing a security token service against the requirements of a web service security policy. The test client may compare any element of a received security token against the requirements of the security policy and decide whether the security token is compliant with such security policy.

An advantage of the present subject matter is that the validity of the security token may be verified without actually sending it to the web service for which it is required.

The security constraint may include an element associated with a name and a value, and the step of comparing may include the further step of verifying that the received security token includes the element associated with the name and the value. An advantage is that any constraint from the security policy description may be verified in the received security token.

Further, the security token may include a key, and the comparison may include the steps of comparing the type of the security token against the expected type as defined in the security constraint; comparing the type and the size of the key of the received security token against the expected key type and size defined in the security constraint. An advantage is that any key for encrypting or signing the security token may be used.

Additionally, the method includes the further step of deciding that the comparison is positive if the security token is compliant with the security constraint, negative if the security token is not compliant and the security constraint is mandatory, inconclusive if the security token is not compliant and the security constraint is optional. An advantage is that verification of security token sent by the security token service may be automated.

As an additional variation, the message so generated may include a SOAP message. An advantage is that embodiments of the present subject matter may be easily deployed in web service environment accepting SOAP messages.

Further, the SOAP message may include a lifetime element for defining when the SOAP message expires. An advantage is that the security of embodiments of the present subject matter may be increased by avoiding that valid messages are re-sent later on, for instance in the context of a replay attack.

Additionally, the SOAP message may include an Entropy element for generating a secret key used to encrypt the security token sent by the security service. An advantage is that messages are encrypted or decrypted faster using symmetric keys which may be generated by the entropy value, than with asymmetric keys.

Still further, the method may include the further step of identifying in the policy description the URL of the security service, so that the SOAP message is sent at the URL. An advantage is that the generation of the code for sending the SOAP message may be generated at run time to automate the creation of test clients for the security token service.

The policy description may include a Web Service security policy. An advantage is that embodiments of the present invention may leverage widely adopted security standards.

The present subject matter includes an apparatus having means adapted for carrying out each step described above. An advantage is that this apparatus may be obtained very easily, thus making the method easy to execute.

The present subject matter includes a computer program comprising instructions for carrying out the steps of the method described above when the computer program is executed on a computer. An advantage is that the invention may easily be reproduced and run on different computer systems.

The present subject matter includes a computer readable medium having encoded thereon a computer program according to the third aspect of the invention. An advantage is that this medium may be used to easily install the method on various apparatus.

Further advantages of the present subject matter will become clear to the skilled person with consideration of the drawings and foregoing detailed description. It is intended that any additional advantages be incorporated therein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   receiving, at a web service client, a policy description for a web service, the policy description comprising a predefined security policy constraint, the policy description requiring that an application requesting execution of the web service also provide a security token generated by a security token service, and requiring that the security token complies with the predefined security policy constraint, where the predefined security policy constraint defines an expected security token type, an expected key type, and an expected key size of security tokens usable to access the web service as specified by the policy description for the web service, and where the security token comprises a key;
   generating a message that is compliant with the policy description for obtaining the security token;
   sending the message to the security token service;
   receiving the security token generated by the security token service in response to receipt of the message; and
   comparing the security token against the predefined security policy constraint to verify compliance of the security token generated by the security token service against the predefined security policy constraint, where comparing the security token against the predefined security policy constraint comprises:
   comparing a security token type of the received security token against the expected security token type as defined in the predefined security policy constraint; and
   comparing a key type and a key size of the key of the received security token against the expected key type and the expected key size defined in the predefined security policy constraint.

2. The method of claim 1, where the predefined security policy constraint comprises an element associated with a name and a value, and where comparing the security token against the predefined security policy constraint to verify compliance of the security token generated by the security token service against the predefined security policy constraint comprises verifying that the received security token comprises the element associated with the name and the value.

3. The method of claim 1, further comprising determining, in response to comparing the security token against the predefined security policy constraint to verify compliance of the security token generated by the security token service against the predefined security policy constraint, that the comparison is positive if the security token is compliant with the predefined security policy constraint, that the comparison is negative if the security token is not compliant with the predefined security policy constraint and the predefined security policy constraint is mandatory, and that the comparison is inconclusive if the security token is not compliant with the predefined security policy constraint and the predefined security policy constraint is optional.

4. The method of claim 1, where generating the message that is compliant with the policy description for obtaining the security token comprises generating a simple object access protocol (SOAP) message that is compliant with the policy description for obtaining the security token.

5. The method of claim 4, where the SOAP message comprises a Lifetime element for defining when the SOAP message expires.

6. The method of claim 4, where the SOAP message comprises an Entropy element for generating a secret key used to encrypt the security token sent by the security token service.

7. The method of claim 4, further comprising identifying, in the policy description, a uniform resource locator (URL) of the security token service and sending the SOAP message using the URL.

8. The method of claim 1, where the policy description comprises a Web Service security policy.

9. The method of claim 1, where the web service client operates as a test client.

10. An apparatus, comprising:
a communication interface; and
a processor programmed to:
receive, at a web service client via the communication interface, a policy description for a web service, the policy description comprising a predefined security policy constraint, the policy description requiring that an application requesting execution of the web service also provide a security token generated by a security token service, and requiring that the security token complies with the predefined security policy constraint, where the predefined security policy constraint defines an expected security token type, an expected key type, and an expected key size of security tokens usable to access the web service as specified by the policy description for the web service, and where the security token comprises a key;
generate a message that is compliant with the policy description for obtaining the security token;
send the message to the security token service via the communication interface;
receive the security token generated by the security token service in response to receipt of the message via the communication interface; and
compare the security token against the predefined security policy constraint to verify compliance of the security token generated by the security token service against the predefined security policy constraint, where, in being programmed to compare the security token against the predefined security policy constraint, the processor is programmed to:
compare a security token type of the received security token against the expected security token type as defined in the predefined security policy constraint; and
compare a key type and a key size of the key of the received security token against the expected key type and the expected key size defined in the predefined security policy constraint.

11. The apparatus of claim 10, where the predefined security policy constraint comprises an element associated with a name and a value, and where, in being programmed to compare the security token against the predefined security policy constraint to verify compliance of the security token generated by the security token service against the predefined security policy constraint, the processor is programmed to verify that the received security token comprises the element associated with the name and the value.

12. The apparatus of claim 10, where the processor is further programmed to determine, in response to comparing the security token against the predefined security policy constraint to verify compliance of the security token generated by the security token service against the predefined security policy constraint, that the comparison is positive if the security token is compliant with the predefined security policy constraint, that the comparison is negative if the security token is not compliant with the predefined security policy constraint and the predefined security policy constraint is mandatory, and that the comparison is inconclusive if the security token is not compliant with the predefined security policy constraint and the predefined security policy constraint is optional.

13. The apparatus of claim 10, where, in being programmed to generate the message that is compliant with the policy description for obtaining the security token, the processor is programmed to generate a simple object access protocol (SOAP) message that is compliant with the policy description for obtaining the security token.

14. The apparatus of claim 13, where the SOAP message comprises:
a Lifetime element for defining when the SOAP message expires; and
an Entropy element for generating a secret key used to encrypt the security token sent by the security token service.

15. The apparatus of claim 13, where the processor is further programmed to identify, in the policy description, a uniform resource locator (URL) of the security token service and send the SOAP message using the URL.

16. A computer program product comprising a computer readable storage device including computer readable program code, where the computer readable program code when executed on a computer causes the computer to:
receive a policy description for a web service, the policy description comprising a predefined security policy constraint, the policy description requiring that an application requesting execution of the web service also provide a security token generated by a security token service, and requiring that the security token complies with the predefined security policy constraint, where the predefined security policy constraint defines an expected security token type, an expected key type, and an expected key size of security tokens usable to access the web service as specified by the policy description for the web service, and where the security token comprises a key;
generate a message that is compliant with the policy description for obtaining the security token;
send the message to the security token service;
receive the security token generated by the security token service in response to receipt of the message; and
compare the security token against the predefined security policy constraint to verify compliance of the security token generated by the security token service against the predefined security policy constraint, where, in causing the computer to compare the security token against the predefined security policy constraint, the computer readable program code when executed on the computer causes the computer to:

compare a security token type of the received security token against the expected security token type as defined in the predefined security policy constraint; and compare a key type and a key size of the key of the received security token against the expected key type and the expected key size defined in the predefined security policy constraint.

17. The computer program product of claim 16, where the predefined security policy constraint comprises an element associated with a name and a value, and where, in causing the computer to compare the security token against the predefined security policy constraint to verify compliance of the security token generated by the security token service against the predefined security policy constraint, the computer readable program code when executed on the computer causes the computer to verify that the received security token comprises the element associated with the name and the value.

18. The computer program product of claim 16, where the computer readable program code when executed on the computer further causes the computer to determine, in response to comparing the security token against the predefined security policy constraint to verify compliance of the security token generated by the security token service against the predefined security policy constraint, that the comparison is positive if the security token is compliant with the predefined security policy constraint, that the comparison is negative if the security token is not compliant with the predefined security policy constraint and the predefined security policy constraint is mandatory, and that the comparison is inconclusive if the security token is not compliant with the predefined security policy constraint and the predefined security policy constraint is optional.

19. The computer program product of claim 16, where, in causing the computer to generate the message that is compliant with the policy description for obtaining the security token, the computer readable program code when executed on the computer causes the computer to generate a simple object access protocol (SOAP) message that is compliant with the policy description for obtaining the security token.

20. The computer program product of claim 19, where the SOAP message comprises:

a Lifetime element for defining when the SOAP message expires; and an Entropy element for generating a secret key used to encrypt the security token sent by the security token service.

21. The computer program product of claim 19, where the computer readable program code when executed on the computer further causes the computer to identify, in the policy description, a uniform resource locator (URL) of the security token service and sending the SOAP message using the URL.

* * * * *